(12) United States Patent
Zhang et al.

(10) Patent No.: US 12,307,684 B2
(45) Date of Patent: May 20, 2025

(54) OPTICAL FLOW TECHNIQUES AND SYSTEMS FOR ACCURATE IDENTIFICATION AND TRACKING OF MOVING OBJECTS

(71) Applicant: NVIDIA Corporation, Santa Clara, CA (US)

(72) Inventors: Dong Zhang, Shanghai (CN); Xi He, Zhejiang (CN)

(73) Assignee: NVIDIA Corporation, Santa Clara, CA (US)

( * ) Notice: Subject to any disclaimer, the term of this patent is extended or adjusted under 35 U.S.C. 154(b) by 288 days.

(21) Appl. No.: 17/834,522

(22) Filed: Jun. 7, 2022

(65) Prior Publication Data

US 2023/0281830 A1    Sep. 7, 2023

Related U.S. Application Data

(63) Continuation of application No. PCT/CN2022/078948, filed on Mar. 3, 2022.

(51) Int. Cl.
G06T 7/215    (2017.01)
G06T 3/4069    (2024.01)

(52) U.S. Cl.
CPC ............ G06T 7/215 (2017.01); G06T 3/4069 (2013.01)

(58) Field of Classification Search
CPC ................... G06T 7/215; G06T 3/4069; G06T 2207/20016; G06T 2207/30261; G06T 7/246
USPC ........................................................ 382/173
See application file for complete search history.

(56) References Cited

U.S. PATENT DOCUMENTS

| | | | |
|---|---|---|---|
| 9,305,362 B1* | 4/2016 | Szedo | H04N 23/6811 |
| 2006/0204040 A1* | 9/2006 | Freeman | G06T 7/246 |
| | | | 382/218 |
| 2013/0083026 A1* | 4/2013 | Lethers | G06T 3/40 |
| | | | 345/428 |

(Continued)

FOREIGN PATENT DOCUMENTS

| | | |
|---|---|---|
| CN | 103237228 A | 8/2013 |
| CN | 103871076 A | 6/2014 |

(Continued)

OTHER PUBLICATIONS

International Search Report and Written Opinion for International Application No. PCT/CN2022/078948, mailed Nov. 30, 2022, 9 Pages.

(Continued)

Primary Examiner — Ali Bayat
(74) Attorney, Agent, or Firm — Lowenstein Sandler LLP

(57) ABSTRACT

Disclosed are apparatuses, systems, and techniques that may perform methods of pyramid optical flow processing with efficient identification and handling of object boundary pixels. In pyramid optical flow, motion vectors for pixels of image layers having a coarse resolution may be used as hints for identification of motion vectors for pixels of image layers having a higher resolution. Pixels that are located near apparent boundaries between foreground and background objects may receive multiple hints from lower-resolution image layers, for more accurate identification of matching pixels across different image levels of the pyramid.

20 Claims, 11 Drawing Sheets

(56) References Cited

U.S. PATENT DOCUMENTS

| | | | |
|---|---|---|---|
| 2016/0012600 A1* | 1/2016 | Kitajima | G06T 1/60 382/224 |
| 2016/0182769 A1* | 6/2016 | Choi | G06V 10/462 348/169 |
| 2016/0379375 A1* | 12/2016 | Lu | G06V 20/10 382/103 |
| 2020/0074185 A1 | 3/2020 | Rhodes et al. | |

FOREIGN PATENT DOCUMENTS

| CN | 106611427 A | 5/2017 |
|---|---|---|
| CN | 108986136 A | 12/2018 |

OTHER PUBLICATIONS

Yunfei Z., et al., "Spatiotemporal Saliency Framework Based On 1-21 Spatial Distribution Of Color And Motion," Application Research of Computers, Jul. 2017, vol. 34(7) 11 Pages.

* cited by examiner

OPTICAL FLOW TECHNIQUES AND SYSTEMS FOR ACCURATE IDENTIFICATION AND TRACKING OF MOVING OBJECTS

TECHNICAL FIELD

At least one embodiment pertains to computational technologies used to perform and facilitate graphics applications. For example, at least one embodiment pertains to operations utilized in identification of moving objects in images and, more specifically, to accurate association of image pixels, including pixels located near boundaries between different objects, to correct objects depicted in the foreground and background of the images.

BACKGROUND

Optical flow techniques are used to identify and track apparent motion of objects depicted in images. A moving object, generally, changes both its location relative to a reference frame of the image-capturing camera (or a vantage point of a synthetic image) as well as its appearance, e.g., pixel intensity. An optical flow characterizes such changes by tracking the intensity changes and the displacement (or velocity) of pixels between two or more images taken (or rendered) at close but different times. For example, a given pixel of an image may be associated with a motion vector that specifies a displacement of the pixel relative to some other reference image, e.g., an earlier image of approximately the same scene. Identification of motion vectors allows tracking of objects, interpolating motion of objects at intermediate times between images, and extrapolating (predicting) motion of objects at times (future or past) that are outside the times for which the existing images are available. The quality of motion tracking and predicting depends on how accurately the pixels of images are segmented into regions that belong to different objects.

BRIEF DESCRIPTION OPTICAL FLOW DRAWINGS

DETAILED DESCRIPTION

Figure 1A:
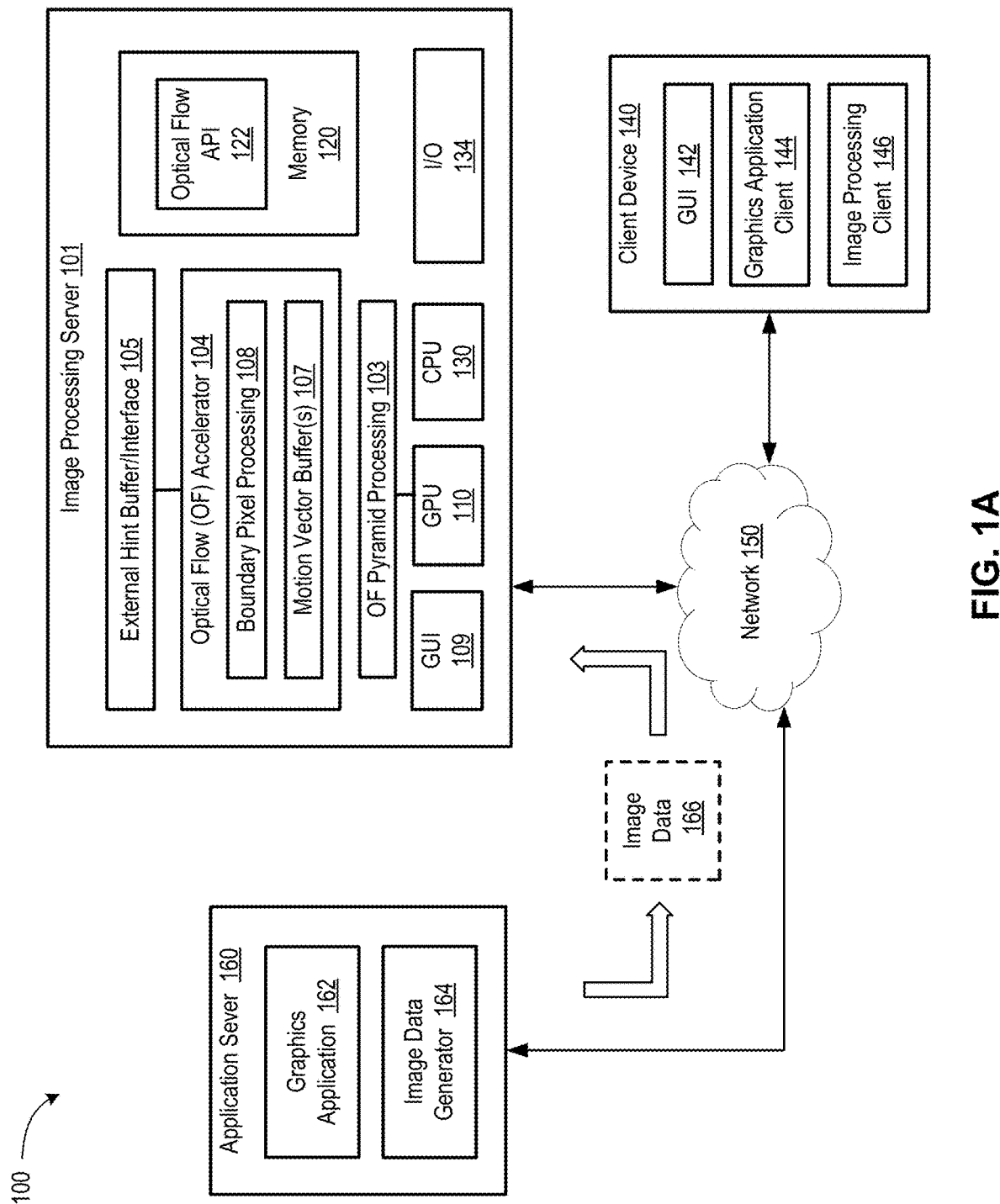
FIG. 1A is a block diagram of an example computer system capable of efficient and accurate handling of object boundary pixels in pyramid optical flow processing, in accordance with at least some embodiments.

Optical flow (OF) of a given image may be specified as a set of motion vectors $MV(x, y)$ characterizing displacement of a pixel with coordinates x and y to the corresponding pixel (e.g., a pixel depicting the same object or a portion of the same object) in a reference image. Some pixels in the given image may have zero (or approximately zero, up to noise) motion vectors, e.g., pixels depicting parts of stationary objects, such as buildings, roadways, sidewalks, tree trunks, etc. Other pixels may have non-zero motion vectors, e.g., pixels depicting parts of moving objects, such as vehicles, people, animals, tree leaves/branches, etc. Yet other pixels may have no motion vectors associated with them, e.g., pixels depicting objects not present in a reference image, such as vehicles that have entered the scene of the image after the reference image was taken. Motion vectors of pixels may be obtained by searching for pixels that most resemble a given pixel (or a locale of pixels that most resemble a similar locale of pixels) in the reference image.

A typical high-resolution image may often have close to or more than a million pixels and independent identification of motion vectors of each pixel may be impractical. To improve computational efficiency, pyramid optical flow techniques may be used. In pyramid optical flow processing, an image is represented via multiple additional images (referred to as image layers) having a progressively decreasing resolution. For example, a 1280×720 pixel image may have a first image layer of 640×360 resolution, a second image layer of 320×180 pixel resolution, a third image layer of 160×90 pixel resolution, and fourth (top) image layer of the lowest 80×45 pixel resolution. Consequently, each pixel (herein referred to as a superpixel) of a subsequent layer of the optical flow pyramid is associated with multiple pixels (or superpixels) of the preceding image layer. Pixels of each subsequent layer may be obtained by blurring, smoothing, convolving, etc. of the pixels of the preceding layer. Motion vectors of the top image layer may be found relatively quickly and then used as hints (likely motion vectors) for the lower levels. For example, a motion vector associated with each pixel of the top 80×45 pixel image layer may serve as a hint for determining motion vectors of four pixels of the 160×90 pixel third image layer, and so on. At each level, the optical flow pyramid processing uses the hints as the starting hypotheses for more accurate search of the motion vectors for the next (less coarse) image layer below, and so on, until the motion vectors for the original image (zeroth level) are identified.

Such pyramid processing may be problematic near boundaries of various objects, such as where a first object in a foreground moves with a different velocity compared with a second object in a background. A superpixel of a j+1-th layer can be associated with multiple, e.g., 4 superpixels of the j-th layer (or 4 pixels of the lowest zeroth layer), some of which, e.g., three (super) pixels can belong to the foreground, while others, e.g., one (super) pixel, can belong to the background (or vice versa). As a result, the superpixel of the j+1-th layer can be associated with the moving object in the foreground and may provide an erroneous hint for the (super) pixel of the j-th layer that corresponds to the stationary background. Similarly, a superpixel that includes a pair of (super) pixels belonging to the foreground and another pair of (super) pixels belonging to the background would provide erroneous hints for the (super) pixels of one of the two pairs. Such erroneous hints can lead to a loss of computational efficiency (by causing the optical flow processing to search for matching (super) pixels in a wrong area) or even to an incorrect optical flow mapping, which can be aggravated with each additional image layer.

Aspects and embodiments of the present disclosure address these and other technological challenges by disclosing methods and systems that enable efficient handling of object boundary pixels and superpixels during pyramid optical flow processing by expanding the source of the received motion vector hints to include hints from neighbor superpixels. More specifically, a given boundary (super) pixel X of the j-th layer can receive not only hints from the superpixel Y of the j+1-th layer that is directly associated with the (super) pixel X, but also neighbor superpixels Y−1, Y+1, etc., of the j+1-th layer. Among these additional superpixels are superpixels that depict those portions of foreground objects and background objects that are farther away from the boundary. The ensuing expanded sampling of possible motion vector hints enables to identify a broader pool of candidate areas in a reference image (or a reference image layer) where best matches for (super) pixel X are likely to be found. Exploring such a broader pool, therefore, allows the optical flow processing to capture (super) pixel matches that otherwise would have been missed.

The advantages of the disclosed techniques include but are not limited to improved efficiency of computations during optical flow pyramid processing as well as accurate identification of pixel motion between different images, identification of moving objects in images, and segmentation of the images into areas that correspond to the moving objects. Accurate determination of the optical flow improves quality of images (e.g., interpolation images) that can be produced based on the existing images.

System Architecture

FIG. 1A is a block diagram of an example computer system 100 capable of efficient and accurate handling of object boundary pixels in pyramid optical flow processing, in accordance with at least some embodiments. As depicted in FIG. 1A, computer system 100 for processing image data 166 may include an image processing server 101, an application server 160, and a client device 140 connected via a network 150. Network 150 may be a public network (e.g., the Internet), a private network (e.g., a local area network (LAN), or wide area network (WAN)), a wireless network, a personal area network (PAN), or any combination thereof.

Image processing server 101 may be (or include) a desktop computer, a laptop computer, a smartphone, a tablet computer, a local server, a cloud server, a dedicated graphics server, a collection of multiple computing devices, a distributed computing system, a smart TV, an augmented reality device, or any other suitable computing device (or collection of computing devices) capable of performing the techniques described herein. Application server 160 and client device 140 may similarly include any computing device referenced above. Alternatively, client device 140 may be a computing device that lacks significant computing resources but is capable of accessing and communicating with image processing server 101 and/or application server 160. Client device 140 may have a graphics user interface (GUI) 142 to facilitate user interaction with client device 140, application server 160, and image processing server 101. GUI 142 may be implemented on a desktop or laptop computer screen, touchscreen, a smart TV screen, or any combination thereof. GUI 142 may include any pointing device (mouse, touchpad, stylus, finger, eye motion-controlled device, etc.), keyboard, control column, game console, and the like. GUI 142 may display stationary and moving objects, light sources, shadows, colors, menus, and so on, e.g., using a browser, a desktop application, a mobile application, etc.

Client device 140 may include a graphics application client 144 and an image processing client 146. Graphics application client 144 may be a client application provided and/or supported by a graphics application 162 running on application server 160. Graphics application 162 may be any gaming, artistic, medical, scientific, engineering application, etc. For example, graphics application 162 may be an image-making application, movie-making application, video game application, engineering application, architectural application, flight simulation application, scene reconstruction application, or the like. Graphics application 162 may operate in conjunction with an image data generator 164. Image data generator 164 may receive, from graphics application 162, settings for one or more images. For example, graphics application 162 may be a video application that provides a gaming context, e.g., current locations of the players relative to a map of buildings. Image data generator 164 may generate coordinates of various objects, trajectories (e.g., speed and direction of motion), brightness, contrast, chromaticity of those objects, intensity and color of light emitted by various light sources, and so on. In some embodiments, image data generator 164 may include any suitable photographic camera and/or a video camera capable of generating multiple images.

The produced image data 166 may include two or more images, which may be synthetic images produced by image data generator 164, real images captured by photographic and/or video cameras, or any combination thereof. The image data may 166 be provided (e.g., over network 150) to image processing server 101 for generation of the optical flow. Optical flow should be understood as any collection of data presented in any suitable form that identifies displacement of any depictions (represented by individual pixels or groups of pixels) of objects or parts of the objects in a given image relative to a different image, referred to as a reference image herein. The reference image may be any image taken at (or rendered for) a different time (e.g., past or future time) and may depict the same or a similar scene. Differences in the image and the reference image may be due to any relative motion between a camera and objects in the scene. The images may be taken by a stationary (relative to the ground) camera or by a moving camera, e.g., by a camera mounted on a vehicle or any other moving body. Optical flow may include any additional data, e.g., changes of pixel and superpixel intensities with time, timestamps, identifications of moving and stationary objects, and/or any additional metadata.

Image data 166 may be used as part of a scenery for a computer game, e.g., a computer game being developed by a user of graphics application 162 via graphics application client 144. Image processing server 101 may be tasked with generating various images to support the computer game.

For example, image processing server 101 may be capable of generating additional images that involve interpolation within the time interval between the times the image and the reference image were taken (e.g. slow motion interpolation), extrapolation to different (e.g., later or earlier) times, extension to different vantage points, different arrangements of the same objects, inclusion of additional objects, modifications of the sources of light, and so on.

The images in the image data 166 may be in any digital (e.g., pixel-based or vector-based) format, including but not limited to JPEG, GIF, PNG, BMP, TIFF, CIB, DIMAP, NITF, and the like. In some embodiments, the image data 166 may be provided in a color space that uses a limited number of primary colors, e.g., RGB space, but it should be understood that any other color space may also be used. Image processing server 101 may use an optical flow accelerator 104 to facilitate and accelerate various operations related to generation of optical flow associated with two or more images. Optical flow accelerator 104 may be implemented via one or more dedicated hardware circuits, which may further be integrated on a common integrated circuit, in at least one embodiment. In some embodiments, optical flow accelerator 104 may be a combination of hardware circuits and software modules, e.g., modules executed by a graphics processing unit (GPU) 110, a central processing unit (CPU) 130, or any other suitable processing device. In some embodiments, optical flow accelerator 104 may be implemented purely in software.

Optical flow accelerator 104 may have access to pyramid processing component 103 to implement hint-based motion vector search across multiple image levels of the optical flow pyramid, as described in more details below. Hints for each progressively higher-resolution image levels may be derived from the motion vectors obtained for the preceding image levels. In some embodiments, hints for the top (lowest-resolution) image level may be stored in an external hint buffer 105, which may be coupled to optical flow accelerator 104 via an external hint interface. In some embodiments, external hint buffer 105 may be populated with some default hints for the top image layer, e.g., zero motion vector hints. In some embodiments, external hint buffer 105 may store user-specified hints, e.g., game-specific hints, or a particular game episode-specific hints. In some embodiments, external hint buffer 105 may store hints from a different image, e.g., hints from a previous image, including the reference image, or some other image. Optical flow accelerator 104 may include one or more motion vector buffers 107 to store intermediate and final motion vectors determined during pyramid optical flow processing. Optical flow accelerator 104 may further include a boundary pixel processing component 108 to perform identification of object boundary pixels and superpixels and selection of multiple hints for (super) pixels located near boundaries of foreground objects and visible portions of background objects, as described in more detail below.

In some embodiments, operations of optical flow accelerator 104 may be fully automated. In some embodiments, some of the operations may be controlled by a user, via GUI 109. If the user is accessing image processing server 101 remotely from client device 140, at least a portion of GUI 109 may be provided to client device 140 as GUI 142. Image processing client 146 may facilitate interaction of the user of client device 140 with optical flow accelerator 104 via optical flow application programming interface (API) 122, which may implement user actions entered via GUI 109. Optical flow API 122 package may enable the user to have two-way communication with optical flow accelerator 104.

Some operations of optical flow accelerator 104 that may be controlled via image processing client 146 may include: selecting a number of image layers of the optical flow pyramid, selecting images and reference images for optical flow processing, selecting a number of intermediate images (frames) to be generated based on the determined optical flow, selecting camera (vantage) points for the new images to be generated, and the like. Optical flow API 122 may deploy any script, code, executable file, library, and the like, or any combination thereof that specifies a sequence and parameters of operations that may be performed by optical flow accelerator 104. Although optical API 122 is shown in FIG. 1A as being located on image processing server 101, in some embodiments, optical flow API package may be downloaded and installed on client device 140, to facilitate user interactions with a remote computing device.

Memory 120 may be communicatively coupled with one or more processing devices of image processing server 101, such as one or more GPUs 110 and one or more CPUs 130. Optical flow accelerator 104 may be operating in conjunction with GPU 110 and/or CPU 130 or any combination thereof. Image processing server 101 may further include one or more input/output (I/O) component(s) 134 to facilitate exchange of information with various peripheral devices.

Even though image processing server 101, application server 160, and client device 140 are shown in FIG. 1A as separate devices, in various embodiments, any two (or all) of these devices may be combined on a single computing machine. For example, image processing server 101 and application server 160 may be executed on the same machine, which is remotely accessed by client device 140. In another embodiment, image processing server 101, application server 160, and client device 140 may be executed on a computer (e.g., desktop or laptop) of a user (or developer).

Figure 1B:
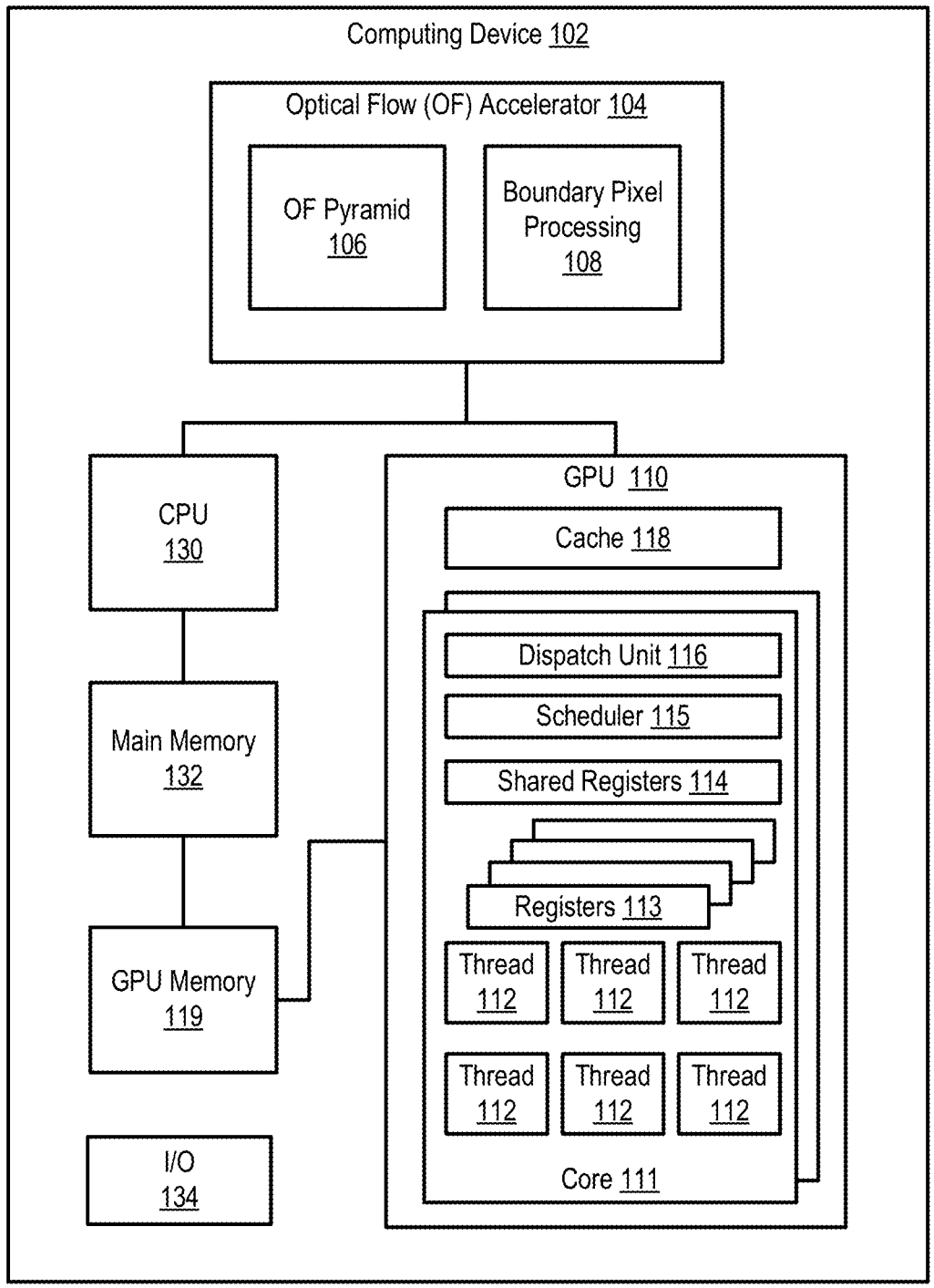
FIG. 1B is an example computing device that may implement optical flow processing with efficient and accurate handling of object boundary pixels, according to at least one embodiment.

FIG. 1B is an example computing device 102 that may implement optical flow processing with efficient and accurate handling of object boundary pixels, according to at least one embodiment. In some embodiments, computing device 102 may be an image processing server 101 or another computing device that implements optical flow accelerator 104. In some embodiments, optical flow accelerator 104 may operate in conjunction with one or more GPUs 110 and may include optical flow pyramid processing component 103 and boundary pixel processing component 108 to perform accurate and efficient optical flow processing of various pixels (and superpixels) of image data 166, including boundary pixels (superpixels). Operations performed by GPU(s) 110 may include pre-processing of image data 166 (e.g., optical flow pyramid formation) and post-processing, including viability checks for the determined optical flow and application of the optical flow for generation of additional images. In some embodiments, a GPU 110 includes multiple cores 111, each core being capable of executing multiple threads 112. Each core may run multiple threads 112 concurrently (e.g., in parallel). In some embodiments, threads 112 may have access to registers 113. Registers 113 may be thread-specific registers with access to a register restricted to a respective thread. Additionally, shared registers 114 may be accessed by all threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 102 may include input/output component(s)

134 to facilitate exchange of information with peripheral devices, as well as users and developers.

In some embodiments, GPU 110 may have a (high-speed) cache 118, access to which may be shared by multiple cores 111. Furthermore, computing device 102 may include a GPU memory 119 where GPU 110 may store intermediate and/or final results (outputs) of various computations performed by GPU 110. After completion of a particular task, GPU 110 (or CPU 130) may move the output to (main) memory 132. In some embodiments, CPU 130 may execute processes that involve serial computational tasks whereas GPU 110 may execute tasks that are amenable to parallel processing. In some embodiments, CPU 130 may determine which processes are to be executed on GPU 110 and which processes are to be executed on optical flow accelerator 104. In other embodiments, GPU 110 may determine which processes are to be executed on GPU 110 and which processes are to be executed on optical flow accelerator 104.

Figure 2:
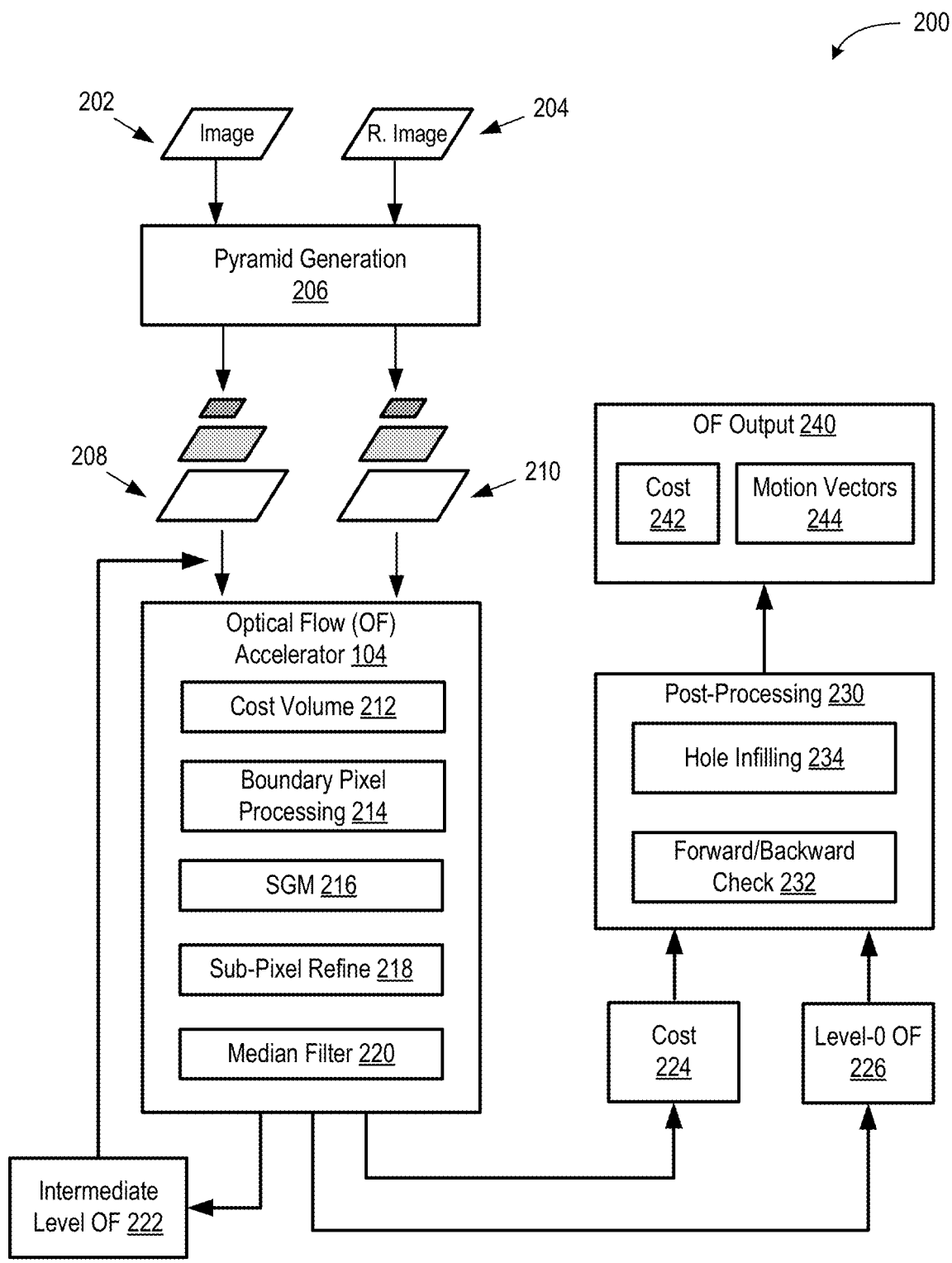
FIG. 2 is an example pyramid optical flow architecture for performing efficient and accurate processing of object boundary pixels, according to at least one embodiment.

FIG. 2 is an example pyramid optical flow architecture 200 for performing efficient and accurate processing of object boundary pixels, according to at least one embodiment. An input into optical flow may include an image 202 and a reference image 204, which may be any images taken at different times of some scene that may depict one or more moving (relative to a camera) objects. Image 202 and reference image 204 may undergo preprocessing that performs pyramid generation 206. Additional preprocessing may include denoising, filtering, and other operations. Pyramid generation 206 may generate an image pyramid 208 that includes any number of image layers of reduced size and resolution. Each subsequent image layer may be obtained by applying a kernel, e.g., a Gaussian blur, a binomial blur, or any other suitable kernel, to determine pixel intensities of each image layer of image pyramid 208. Similarly, pyramid generation 206 may generate a reference image pyramid 210 based on reference image 204.

Image pyramid 208 and reference image pyramid 210 may then be processed by optical flow accelerator 104. Optical flow accelerator 104 may start at the top (lowest resolution) image layer and use motion hints from lower-resolution image layers to determine motion vectors of higher-resolution layers, which are subsequently used as hints for yet higher-resolution image layers. Motion vector for a given (super) pixel may be determined using a cost volume computation 212 that evaluates a mismatch between (super) pixels of a certain neighborhood (search window) in a reference image layer identified by the hint motion vector and the same neighborhood in the image layer of the corresponding resolution. Boundary (super) pixel processing 214 may use multiple hints from lower-resolution image layers, as described below in more detail in conjunction with FIGS. 4A-B. Processing of each image layer may further include application of semi-global matching (SGM) algorithm 216, which performs path cost computation based on cost volume 212. Each image layer may be further processed by sub-pixel refine algorithm 218, which calculates subpixel position based on winner motion vectors and computed costs. Each image layer may be further processed by a median filter 220, which performs smoothing of determined motion vectors based on weighted motion vectors of a predetermined neighborhood of each (super) pixel.

As indicated by block 222, all intermediate image layers of image pyramid 208 and reference image pyramid 210 may be processed iteratively (e.g., sequentially). The output of optical flow accelerator 104 may include cost 224 associated with the determined level-0 optical flow 226 of the highest-resolution zeroth image layer, which represents the motion vectors for the original image 202 relative to the original reference image 204. Cost 224 and level-0 optical flow 226 may undergo post-processing 230. Post-processing 230 may include forward/backward check 232, which swaps image 202 and reference image 204 and determines a difference (e.g., Euclidean distance) between forward optical flow and the reverse (backward) flow. If the difference is above a predetermined threshold, the obtained level-0 optical flow 226 may be invalidated. Post-processing 230 may further include hole infilling 234, which fills voids remaining in the determined optical flow (e.g., caused by occlusions). The optical flow output 240 of post-processing 230 may include a final cost 242 and motion vectors 244, and may be used by graphics application 162 and/or image data generator 164 for any suitable purpose, e.g., generation of additional images, tracking of objects depicted in images, and so on.

Figure 3A:
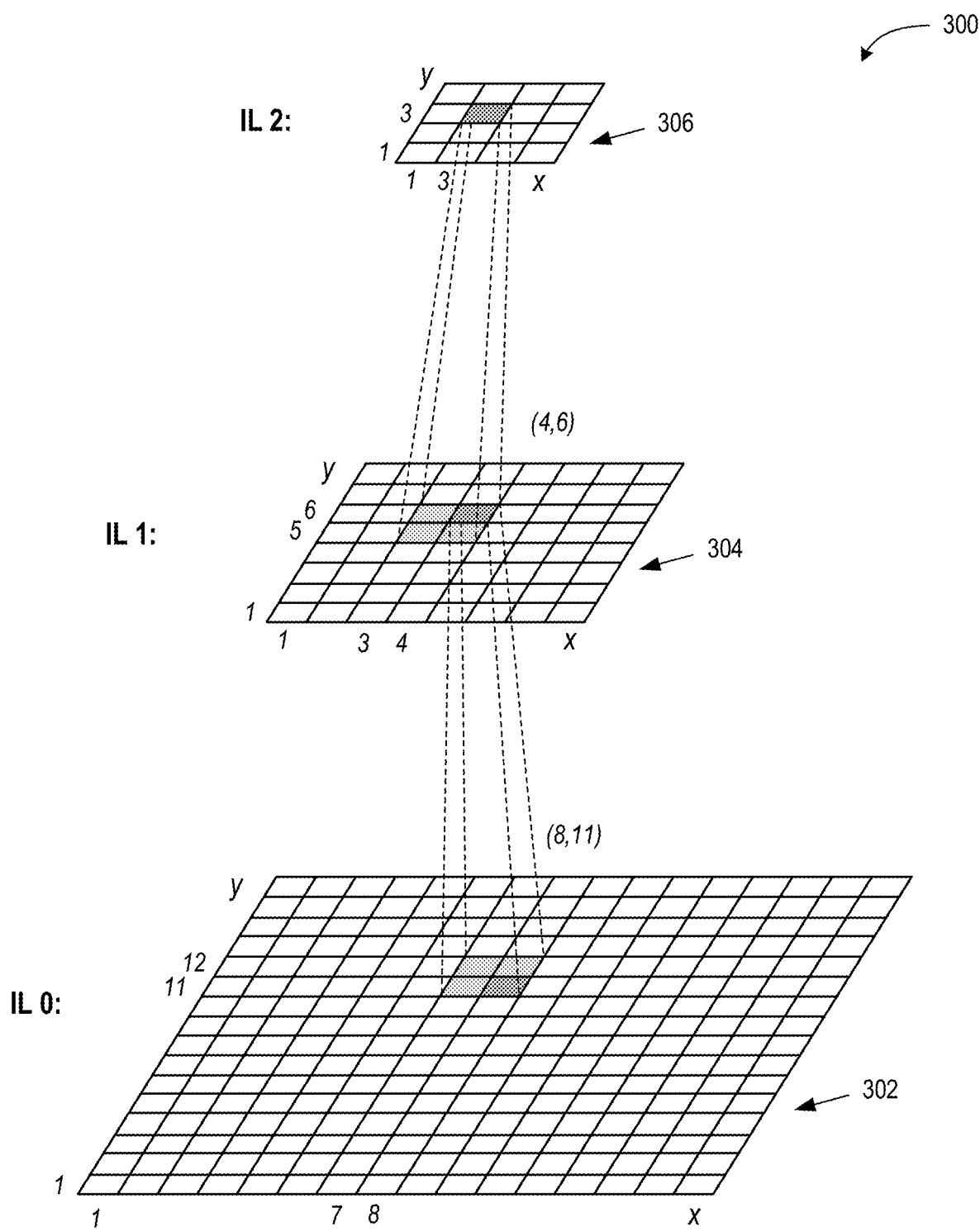
FIG. 3A illustrates a pyramid structure of multiple image layers of varying resolution for efficient representation of images in optical flow processing, according to at least one embodiment.

FIG. 3A illustrates a pyramid structure 300 of multiple image layers of varying resolution for efficient representation of images in optical flow processing, according to at least one embodiment. For conciseness and ease of illustration, FIG. 3A shows an example image 302 with dimensions 16×16 pixels, but it should be understood that images or arbitrary size $M_0 \times N_0$ may be represented similarly. Pixels of image 302 may be identified as two-dimensional vectors (x,y), with x and y taking values 1, 2, ... 16, or any other interval of values 1, 2 ... $M_0$ (or 1, 2 ... $N_0$). For example, the dark pixel of image 302 may be identified as pixel (8,11). The enumeration of pixels, as used herein, is illustrative only; in some embodiments, a different enumeration may be used, e.g., with x (and y) taking values 0, 1, ... $M_0-1$ (and 0, 1 ... $N_0-1$). Each pixel of image 302 should be understood as a set of values {I}(x, y) defined (and stored) in association with the coordinates of the pixel. The set of values {I} may include a single intensity value I (in the instances of black-and-white images) or multiple intensity values (in the instances of color images), {I}=$I_1, I_2 \ldots$, which may be RGB (red, green, blue) intensity values, CMYK (cyan, magenta, yellow, key) intensity values, or any other suitable intensity values. The term "pixel" should be understood as any unit of graphical information, which may be the smallest unit determined by the resolution of image 302. In some embodiments, "pixel" may include multiple smallest units of graphical information that are treated as having the same motion vector.

As illustrated in FIG. 3A, image 302 is represented with a first image layer (IL) 304 and a second IL 306; image 302 may also be referred to as zeroth IL herein. The first IL 304 may represent image 302 with a reduced resolution. For example, the first IL 304 may be a downscaled representation of image 302. In some embodiments, the downscaled representation may be of a size $M_1 \times N_1$ where $M_1 = M_0/SF(1)$ and $N_1 = N_0/SF(1)$, with SF(1) being a first scaling factor. For example, the first IL 304 is a downscaled representation with the scaling factor SF(1)=2, which performs a uniform scaling along both dimensions of image 302. In some embodiments, different scaling factors may be used for (non-uniform) image scaling along different dimensions, e.g., with scaling factor $SF_X(1)=4$ along the x-axis and scaling factor $SF_Y(1)=2$ along the y-axis. Each pixel of the first IL 304, herein also referred to as a superpixel, images an area that is $[SF(1)]^2$ larger than the area imaged by one pixel of image 302 (or $(SF_X) \times (SF_Y)$ larger, in the instances of non-uniform scaling). Correspondingly, each superpixel of first IL 304 may be associated with multiple pixels of image 302. For example, superpixel (4,6) of the first IL 304 may be associated with four pixels (7,11), (7,12), (8,11), and (8,12)

of image 302, as depicted schematically with the corresponding dashed lines. Similarly, an arbitrary superpixel (x, y) of first IL 304 may be associated with pixels (2x−1,2y−1), (2x−1,2y), (2x, 2y−1), and (2x, 2y) of image 302.

Each superpixel (x, y) of the first IL 304 may include a set of intensity values $\{I\}_{SP}$ that are obtained from intensity values of pixels of image 302. For example, intensity $I_{SP}$ (x, y) of superpixel (x, y) of first IL 304 may be obtained by convoluting intensities of pixels of image 302 with any suitable kernel K(x, y), e.g. $I_{SP}(x, y)=\Sigma_{x', y'}K(x-x'; y-y')I_P$ (x', y'), e.g., a binomial kernel, a Gaussian kernel, and the like. Application of the kernel may include smoothing (blurring), denoising, filtering, or performing any other pixel processing operations.

Additional ILs may be formed similarly. For example, the second IL 306 may be a representation of first IL 304 (and, therefore, of image 302) of a yet coarser resolution. For example, the second IL 306 may be a downscaled representation of the first IL 304. In some embodiments, the second IL 306 may be of a size $M_2 \times N_2$, where $M_2=M_0/SF(2)$ and $N_0=N_2/SF(2)$, and with SF(2) being a second scaling factor. In some embodiments, the second scaling factor may be a square of the first scaling factor, $SF(2)=[SF(1)]^2$. For example, the depicted second IL 306 is a (uniformly) downscaled representation of image 302 with the scaling factor SF(2)=4. In some embodiments, similarly to the first IL 304, different scaling factors may be used for non-uniform image rescaling along different dimensions. Each superpixel of the second IL 306 depicts an area that is $[SF(2)]^2$ larger than the area imaged by one pixel of image 302. As a result, each superpixel of second IL 306 may be associated with multiple superpixels of the first IL 304. For example, superpixel (2,3) of the second IL 306 may be associated with four superpixels (3,5), (3,6), (4,5), and (4,6) of the first IL 304, as depicted schematically with the corresponding dashed lines. Similarly, an arbitrary superpixel (x, y) of the second IL 306 may be associated with superpixels (2x−1,2y−1), (2x−1,2y), (2x, 2y−1), and (2x, 2y) of the first IL 304.

Intensity values of superpixels of the second IL 306 may be obtained using superpixels of the first IL 304 that is similar to the above-described procedure of obtaining superpixels of the first IL 304 from pixels of image 302, e.g., using smoothing, blurring, convolving, etc., of superpixels of the second IL 306. In some embodiments, intensity value(s) of superpixels of the second IL 306 may be obtained directly from intensities of pixels of image 302.

Although two ILs (in addition to the zeroth IL, the image itself) are depicted in FIG. 3A, the pyramid structure 300 may include any number of ILs, including one IL, three ILs, four ILs, and so on. In some embodiments, the number of ILs may be dynamic, e.g., dependent on the size of image 302, resolution of image 302, expectancy of encountering depictions of a large number of fast objects in image 302, and so on. The number of ILs may be application-dependent. For example, an image 302 that is expected to have depictions of a larger number (e.g., three, four, etc.) of moving objects, may be represented with a larger number of ILs whereas an image 302 that is expected to have depictions of a smaller number (e.g., one or two) of moving objects, may be represented with a smaller number of ILs.

In some embodiments, pixels and superpixels may be associated with a depth. In gaming applications, depth may be a discrete parameter indicating which objects are closer to the camera (vantage point) and which objects are farther away from it. In automotive applications, traffic monitoring applications, security applications, or any other real-life applications, depth may be determined using radar data, lidar data, camera data (e.g., camera focal distance data), and may be a continuous (or quasi-continuous) parameter. Superpixels may similarly be associated with depth, which may be computed as an average depth of all pixels of image 302 or superpixels or first IL 304 (second IL 306, etc.) that are associated with a particular superpixel. In some embodiments, depth of superpixels may be determined as the depth of the majority of pixels (or superpixels) associated with a particular superpixel, or in any other suitable way.

Figure 3B:
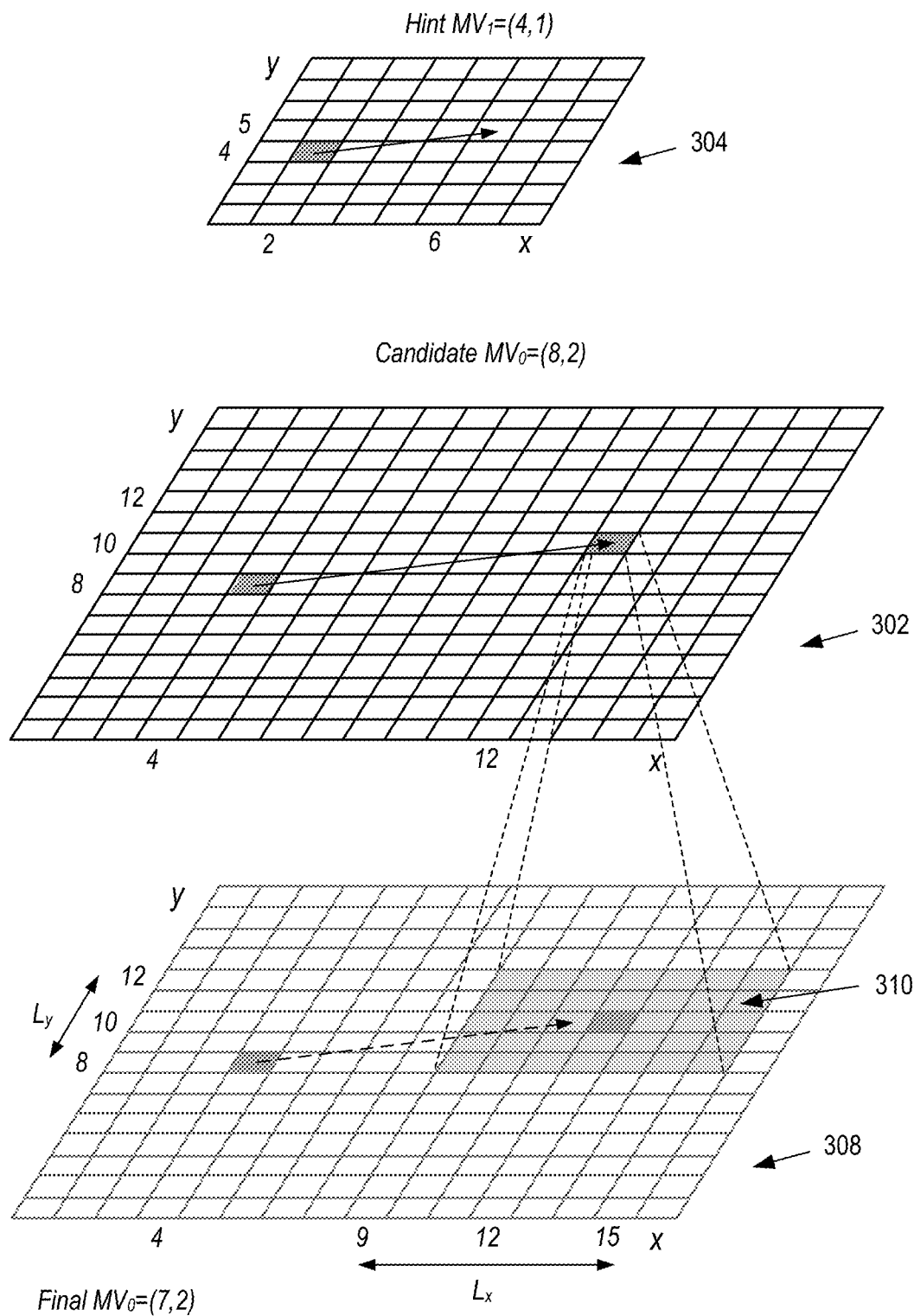
FIG. 3B illustrates using the pyramid structure for identification of motion of objects in optical flow processing, according to at least one embodiment.

FIG. 3B illustrates using the pyramid structure for identification of motion of objects in optical flow processing, according to at least one embodiment. For conciseness, FIG. 3B illustrates operations that involve the first IL 304 and the zeroth IL (image 302), but it should be understood that similar operations may be performed in conjunction with any pair of ILs (e.g., j+1-th IL and j-th IL) of the pyramid structure 300 described above in conjunction with FIG. 3A. Pyramid structure 300 may be used to identify motion vectors MV for at least some (and, in some instances, all) pixels of image 302. A motion vector, MV(x, y), specifies displacement of a pixel (x, y) relative to some other reference image 308, which may be a previous image of the same scene or a modification (e.g. time evolution) of the same scene. In some embodiments, reference image 308 may be a future image of the same scene. For example, a motion vector of a pixel that depicts a portion of a door of a car in image 302 may identify the location of the corresponding pixel (depicting the same car door) in a prior reference image 308.

In optical flow pyramid processing, motion of pixels may be determined starting with higher ILs that have fewer superpixels and, correspondingly, represent coarser images of the same scene, and progressing iteratively to lower ILs until motion is identified for the ultimate highest resolution image (zeroth IL). In such iterative pyramid processing, motion vectors for the coarser ILs serve as "hints" for more precise identification of motion vectors of ILs of finer resolution. In some embodiments, the topmost IL used in the pyramid processing may have no motion vector hints. In such embodiments, motion vectors for the topmost IL may be determined by splitting the topmost IL of the image into superpixel blocks (e.g., 4×4 superpixel blocks) and matching appearance of such superpixel blocks to various superpixel blocks of the topmost IL of the reference image and selecting the best match for each block. In some embodiments, motion vectors for the topmost IL may be provided by an application that uses optical flow image processing, e.g., by graphics application 162.

As illustrated in FIG. 3B, determining a motion vector for a given pixel of image 302 (or, similarly, for any superpixel of a higher j-th IL) may include identifying a superpixel of the first IL 304 (or, similarly, a superpixel of the j+1-th IL) that is associated with the given pixel (or superpixel of the j-th IL). For example, pyramid optical flow processing may first identify that pixel (4,8) of image 302 is associated with superpixel (2,4) of the first IL 304, as described above in conjunction with FIG. 3A. A motion vector for superpixel (2,4) of the first IL 304, used as the hint for pixel (4,8) of image 302, may be $MV_1(x, y)=(4,1)$, indicating that the displacement of pixel (2,4) relative to a first IL (not shown) of reference image 308 is by four superpixels along the x-axis and one superpixel along the y-axis. The motion vector $MV_1(x, y)$ may be used as a hint motion vector to identify a candidate motion vectors for the associated pixel of image 302:

$$MV_0(2x,2y)=2 \cdot MV_1(x,y),$$

where the scaling factor 2 is used. In those embodiments where a different scaling factor SF(1) is used, rescaling of motion vectors may be performed by replacing the scaling factor 2 with the appropriate scaling factor SF(1). Since multiple pixels (e.g., $[SF(1)]^2$ pixels) of image 302 are associated with a single superpixel of the first IL 304, the same value $MV_0(2x, 2y)$ may be used as a hint for multiple pixels, e.g., pixels (2x, 2y), (2x–1,2y), (2x, 2y–1), and (2x–1,2y–1) of image 302. As depicted, the candidate motion vector $MV_0(4,8)=(8,2)$. Correspondingly, pixel (12, 10) (namely, pixel (4,8) shifted by (8,2)) serves as a center pixel (dark pixel) of a search window 310 (shaded area) applied to reference image 308. The center pixel (12,10) serves as the probable location for a pixel in reference image 308 that matches pixel (4,8) in image 302. On the other hand, since image 302 (and reference image 308) have a higher resolution than the first IL 304 (and a corresponding IL of reference image 308), the actual location of the best match pixel in reference image 308 may be different. To capture such a possibility, search window 310 may be selected to have a size $L_x \times L_y$ that is likely to capture the best matching pixel. Illustrated in FIG. 3B is a 7×5 search window 310 but any other suitable search window may be used instead. A search window may be rectangular, square, or have some other shape. In some embodiments, search windows may be different (in size and shape) for center pixels near the edges of image 302 and/or reference image 308. For example, a search window for a center pixel located near an edge or corner of reference image 308 may have a reduced (truncated) size, a triangular shape, and so on.

Pixel intensities $J_i$ of different pixels within search window 310 of reference image 308 may be compared by with corresponding pixel intensities $J_i$ of the pixel (e.g., pixel (4,8) or any other pixel) in image 302. The comparison may be performed using any suitable cost function (loss function), e.g., a simple quadratic cost function, $C=\Sigma_i(I_i-J_i)^2$, which weighs mismatches of different intensities (e.g., R, G, B intensities) equally, or a weighted quadratic cost function $C=\Sigma_i W_i(I_i-J_i)^2$, which weighs mismatches of different intensities differently using empiric (e.g., application-dependent) weights $W_i$. Any other cost function may be used, including but not limited to the mean absolute error, smooth mean absolute error, log-cosh function, binary cross-entropy function, and the like. A pixel of reference image 308 that matches the pixel of image 302 most closely (e.g., has the lowest cost function) may then be used to identify a motion vector for the pixel. For example, pixel (11,10) of reference image 308 may be identified as the best match for pixel (4,8) of image 302. Correspondingly, the motion vector $MV_0(4, 8)=(7,2)$ illustrated with the dashed arrow in FIG. 3B may be selected as the final motion vector for pixel (4,8) of image 302.

Figure 3C:
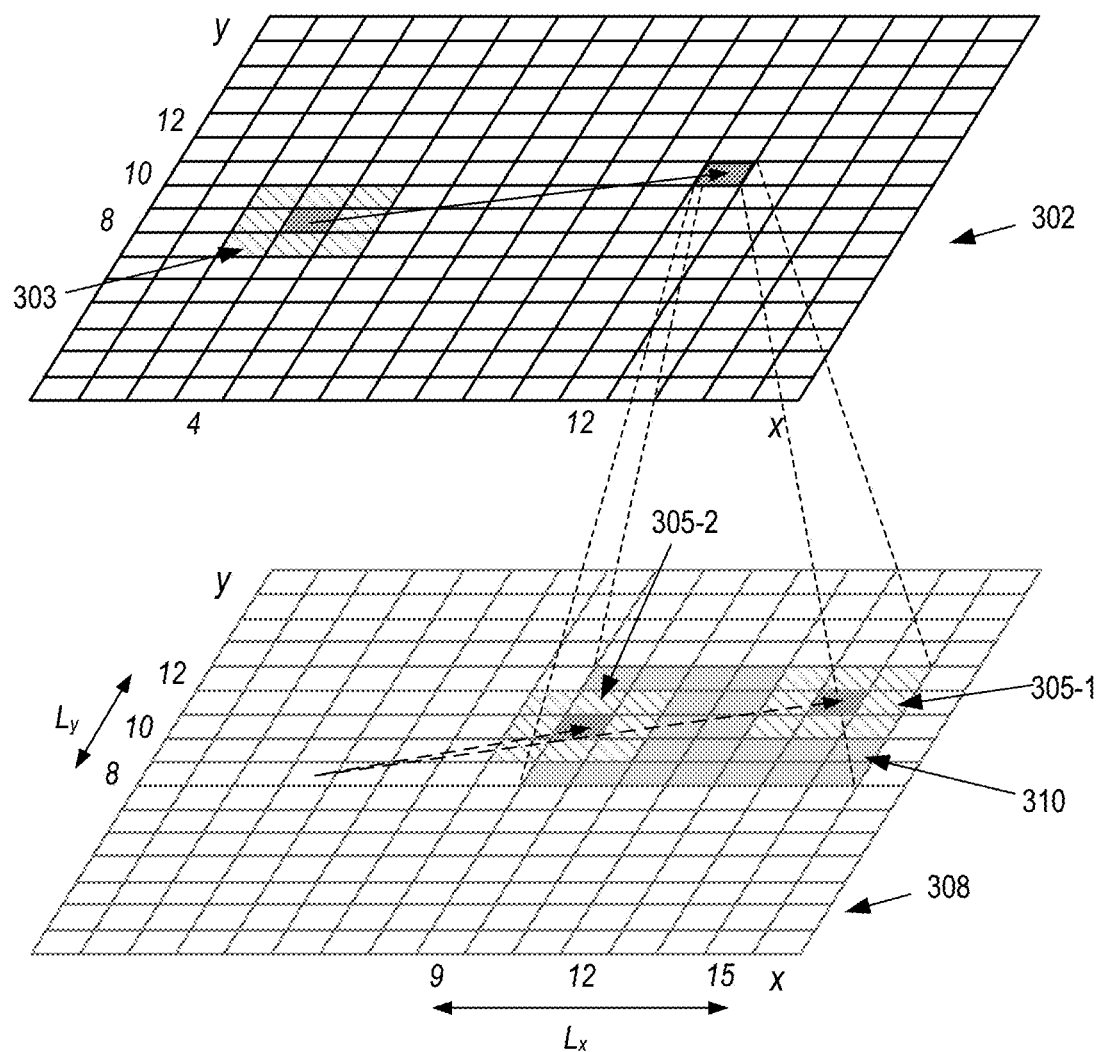
FIG. 3C illustrates using match windows for determination of motion vectors during optical flow processing, according to at least one embodiment.

In some embodiments, the motion vector for a given pixel of image 302 (and, similarly, for superpixels of various higher ILs) may be determined based on more than a single pixel matching. FIG. 3C illustrates using match windows for determination of motion vectors during optical flow processing, according to at least one embodiment. To avoid accidental false positive matching of pixels of similar intensities in image 302 and reference image 308, a geometric context of pixels may be taken into account. More specifically, as depicted with a shaded square centered at pixel (4,8) of image 302, a certain neighborhood—match window 302—of the pixel may be selected. Although a 3×3 pixel match window 302 is shown for illustration, match windows of any size may be used, including rectangular match windows, match windows in the form of a cross, or any other suitable shape.

For various possible motion vectors, indicated with dashed arrows, a respective match window 305-n may be identified in reference image 308. Two match windows 305-1 and 305-2 are illustrated in FIG. 3C, but $L_x \times L_y$ (the size of search window 310) different match windows may be identified in reference image 308. Cost functions may be computed for each match window 305-n in reference image 308, e.g., by adding cost functions of individual pixels in match window 303 of image 302 and pixels in the corresponding positions in match window(s) 305-n of reference image 308. In some embodiments, cost functions of different pixels may be added with uniform weights, e.g., cost functions characterizing mismatch of center pixels may be weighed the same as cost functions characterizing mismatch of corner pixels. In some embodiments, cost functions of different pixels may be weighed with different weights, e.g., cost functions characterizing mismatch of center pixels may be weighed more than cost functions characterizing mismatch of corner pixels, or side pixels. Any suitable distribution of weights of cost functions may be used, e.g., an empirically selected distribution of weights. Similarly to FIG. 3B, a motion vector that connects centers of match windows with the lowest cost function may be selected as the final motion vector for a given pixel of image 308 (e.g., pixel (4,8) in this example).

The techniques described above in conjunction with FIGS. 3A-C may be similarly applied for identification of motion vectors of the first IL based on motion vector hints from the second IL, identification of motion vectors of the second IL based on motion vector hints from the third IL, and so on, up to the last IL.

Figure 4A:
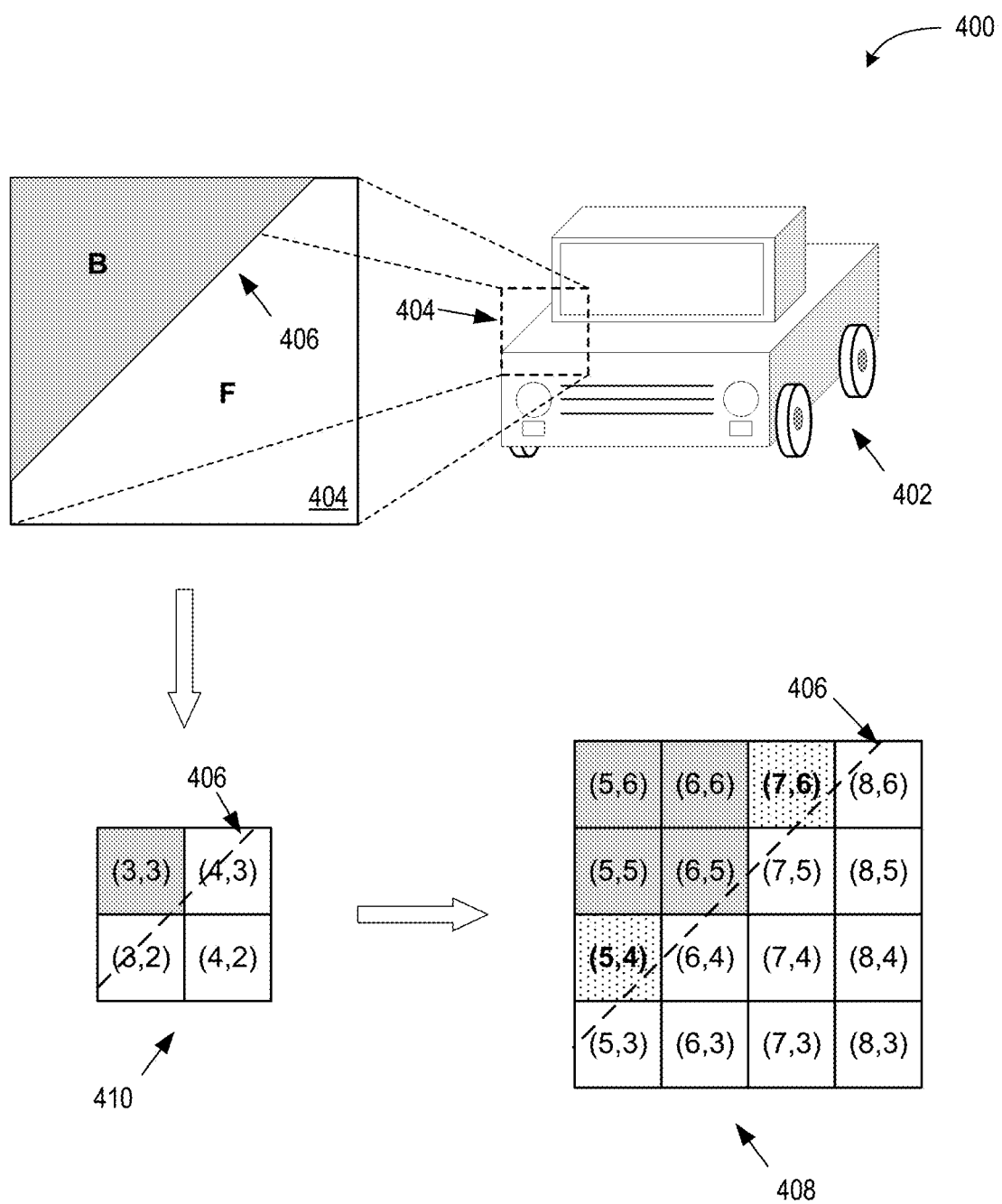
FIG. 4A illustrates pixel-superpixel association during optical flow processing of object boundary pixels, according to at least one embodiment.

FIG. 4A illustrates pixel-superpixel association 400 during optical flow processing of object boundary pixels, according to at least one embodiment. In typical images that depict one or more moving objects and one or more stationary objects, some objects can be located in a foreground and are closer to the camera (or viewer) while other objects are located in a background and are farther away from the camera (or viewer). Depictions of such objects are separated by edge pixels that are located in the vicinity of a visual boundary between objects. As illustrated in FIG. 4A, a depiction of an object (vehicle) 402 includes a portion 404 that includes a white foreground (F) section, which depicts part of vehicle 402, and a shaded background (B) section, which depicts, e.g., stationary objects (road surface) or background vehicles. A boundary 406 separates the two sections.

FIG. 4A further depicts a pixelated region 408 of an image 302 (from FIGS. 3A-C) of corresponding to portion 404. Although region 408 is shown to have 16 pixels, this should be understood as an illustration only (and not to scale) as any number of pixels may be located near an edge region. In particular, shown are pixels having x- and y-coordinates in the interval [5,8]. Region 408 of the image may be associated with a corresponding region 410 of the first IL 304 having x- and y-coordinates of the corresponding superpixels in the interval [3,8]. As described above in conjunction with FIG. 3A, superpixel (3,2) of the first IL 304 is associated with four pixels of image 302: (5,3), (6,3), (5,4), and (6,4). Similarly, superpixel (4,3) of the first IL 304 is associated with four pixels: (7,5), (8,5), (7,6), and (8,6).

For some pixel-superpixel associations, belonging of pixels and superpixels to the foreground or background is unambiguous. For example, superpixel (4,2) and the associated with this superpixel pixels (7,3), (8,3), (7,4), and (8,4) depicts only the foreground. Similarly superpixel (3,3) and pixels (5,5), (6,5), (5,6), and (6,6) predominantly depict the background, with only a small portion of pixel (6,5) capturing the foreground. Superpixels (3,2) and (4,3), on the other hand, predominantly depict the foreground, but associated with this superpixel pixels (5,4) and (7,6) predominantly depict the background.

Since pixels of the image receive hint motion vectors from superpixels of the first IL 304, pixels (5,4) and (7,6) may have large hint motion vectors that would cause the corresponding search windows for these pixels to be centered at distant (and incorrect) locations within reference image 308. This could cause the optical flow processing to miss the correct pixel matching and generate a sub-optimal optical flow. As illustrated by FIG. 4A, a more accurate search window would be obtained if edge pixels (5,4) and (7,6) were to receive hint motion vectors from superpixel (3,3). To take advantage of an expanded pool of motion vectors, the optical flow processing may identify multiple hint motion vectors associated with superpixels that are different from the superpixel that is immediately associated with a given edge pixel.

Figure 4B:
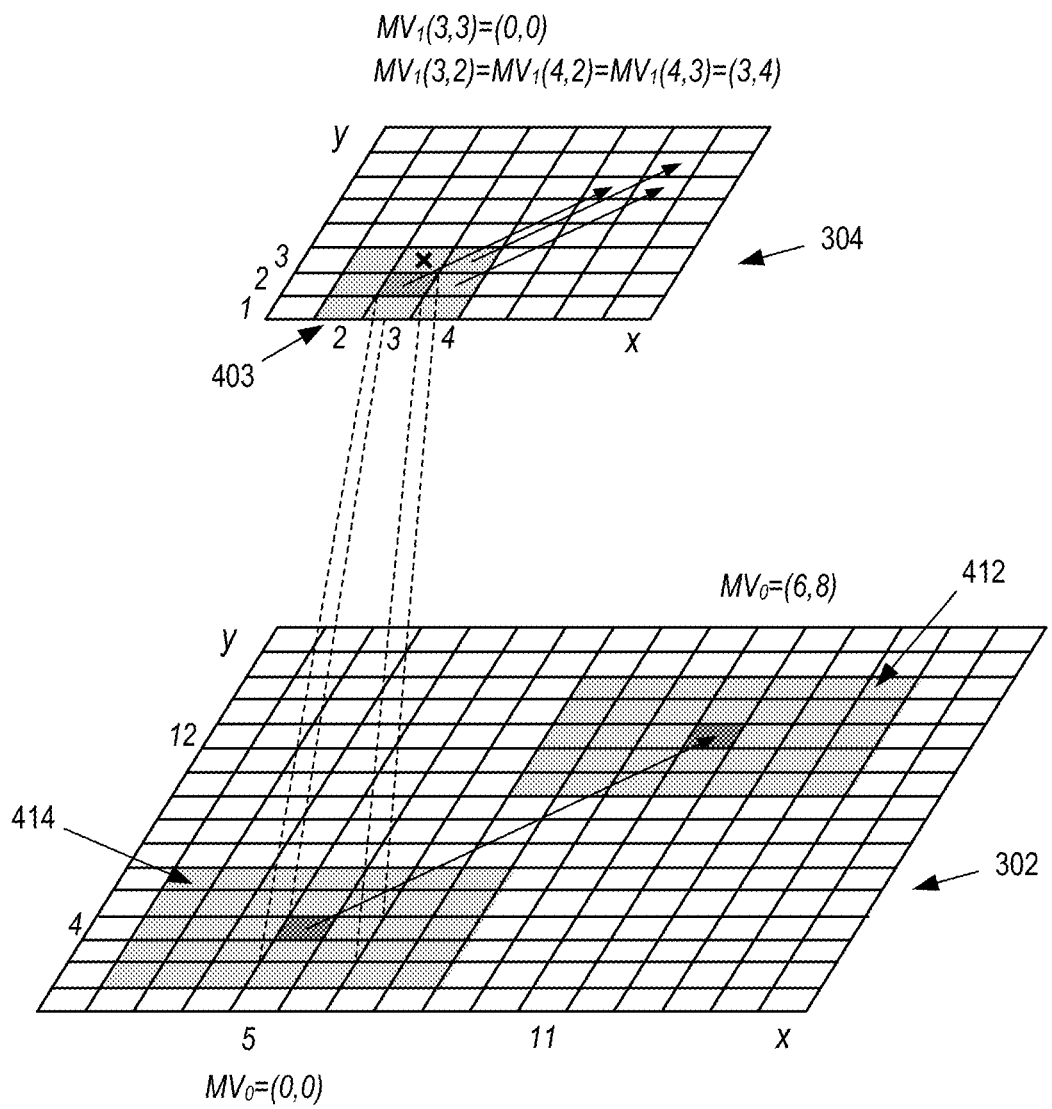
FIG. 4B illustrates identification of motion vector hints during optical flow processing of object boundary pixels, according to at least one embodiment.

FIG. 4B illustrates identification of motion vector hints during optical flow processing of object boundary pixels, according to at least one embodiment. As an example, FIG. 4B illustrates identification of motion vector hints and use of the identified hints for boundary (edge) pixel (5,4) of FIG. 4A, but other pixels may be processed similarly. As shown in FIG. 4B, pixel (5,4) of image 302 is associated with superpixel (3,2) of the first IL 304. Superpixel (3,2) may correspond to a moving background (vehicle) and may have $MV_1(3,2)=(3,4)$. Since pixel (5,4) of image 302 may depict a portion of a stationary background, in addition to hint $MV_1(3,2)$, processing of pixel (5,4) may further involve motion vectors of superpixels in some neighborhood of pixel (3,2), e.g., motion vectors of the nearest neighbor superpixels in the shaded region 403. In some embodiments, the neighborhood of superpixel (3,2) may include more than the nearest neighbor superpixels, e.g., the second-nearest neighbor superpixels or even more distant superpixels.

Each of the superpixels of the neighborhood may be associated with its own motion vector and may, accordingly, generate a different search window. For example, superpixels (3,2), (3,4), and (4,3) may have the same motion vector (3,4) for the first IL 304 and may correspond to a respective scaled up candidate motion vector $MV_0=(6,8)$ for image 302. This scaled up motion vector may determine a search window 412 centered at pixel (11,12). Similarly, superpixel (3,3) may have a different motion vector, e.g., $MV_0=(0,0)$ (as depicted with a cross in FIG. 4B) that corresponds to a stationary background in the present example, and may lead to a different search window, e.g., search window 414 centered at pixel (5,4). As a result, optical flow processing will be able to determine the best match for pixel (5,4) and confirm that the final motion vector for this pixel is indeed $MV_0=(0,0)$. Although in the present example of a boundary between two objects (e.g., a vehicle and a background), only two different search windows appear, in general situations any other number of search windows may be identified using the described techniques (e.g., up to the total number of different superpixels within the neighborhood, such as 9 in the present example). In some instances, three (or even more) different motion vectors may be identified in a given neighborhood of superpixels, e.g., if the neighborhood of superpixels overlaps with three objects moving with different velocities relative to the camera (viewer).

In some embodiments, the depth level of various pixels and superpixels may be known and used for optimization of the optical flow processing. For example, it may be known that the depth of pixel (5,4) of image 302 belongs to level of depth $D_0$. Additionally, depth of various neighbor superpixels of the shaded region 403 may be identified. Some of the superpixels may have the same depth $D_0$ whereas other superpixels may have different depths $D_1$, $D_2$, etc. In some embodiments, e.g., in gaming applications, superpixels that have different depths than $D_0$ may be excluded and the motion vectors of the excluded superpixels are not used as hints for pixel (5,4). In some embodiments, e.g., in real-life applications where depth is a more continuous variable (e.g., determined from radar, camera, and/or lidar data), all superpixels with the depth mismatch that is less than a certain (e.g., empirically determined) threshold may be considered. In such embodiments, depth mismatch of the superpixels may be added as another term in the cost function, such that larger depth mismatches are disfavored but not eliminated outright.

The techniques described above in conjunction with FIGS. 4A-B may be similarly applied for identification of motion vectors of boundary superpixels of the first IL based on a neighborhood of motion vector hints from the second IL, identification of motion vectors of the second IL based on a neighborhood of motion vector hints from the third IL, and so on, up to the last IL.

Although the techniques of boundary pixel/superpixel processing described above may be contingent on identification of boundary pixels/superpixels, in some embodiments no such identification is performed, as all pixels/superpixels may receive multiple hints from the coarser ILs, e.g., each (super) pixel of j-th IL may receive several (e.g., nine) motion vector hints from a neighborhood of (super) pixels from j−1-th IL regardless of whether the respective (super) pixel is located near a boundary between two (or more) objects.

Figure 5:
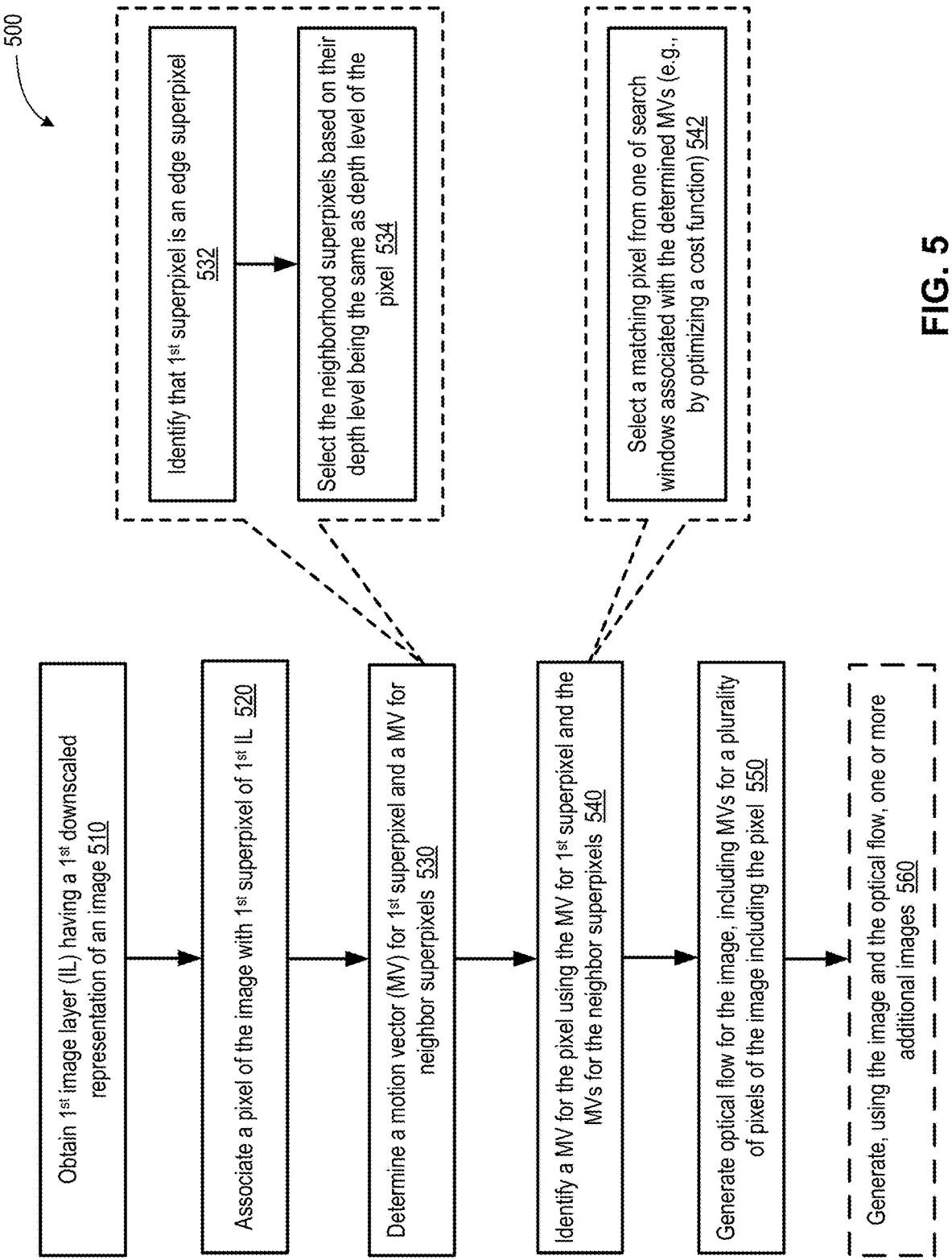
FIG. 5 is a flow diagram of an example method of pyramid optical flow processing with identification and handling of object boundary pixels at the highest resolution level, according to at least one embodiment.
Figure 6:
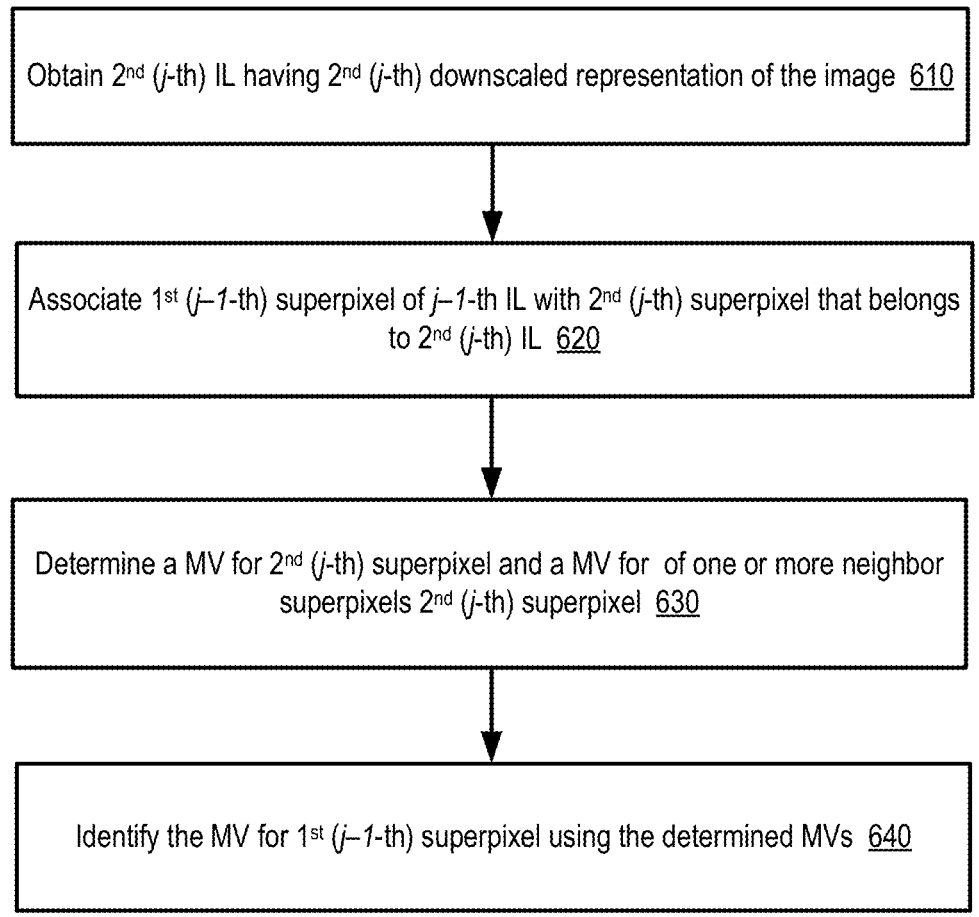
FIG. 6 is a flow diagram of an example method of pyramid optical flow processing with identification and handling of object boundary pixels at reduced resolution levels, according to at least one embodiment.

FIG. 5 and FIG. 6 are flow diagrams of respective example methods 500 and 600 of pyramid optical flow processing with efficient identification and handling of object boundary pixels, according to some embodiments of the present disclosure. Methods 500 and 600 may be performed by one or more processing units, which may include (or communicate with) one or more memory devices. The processing unit(s) may include optical flow accelerator 104 implemented as one or more circuits. Optical flow accelerator may include (or communicate with) one or more high-speed memory buffers, e.g., external hint buffer 105 to store hints for the top image layer, motion vector buffer(s) 107 to store intermediate and final motion vectors identified during pyramid optical flow processing, and/or other memory buffers, registers, cache, and the like. In at least one embodiment, method 500 and method 600 may be performed by processing units of computing device 102. In at least one embodiment, method 500 and method 600 may be performed by multiple processing threads (e.g., CPU threads and/or GPU threads), each thread executing one or more individual functions, routines, subroutines, or operations of the method. In at least one embodiment, processing threads implementing method 500 (and, similarly, method 600) may be synchronized (e.g., using semaphores, critical sections, and/or other thread synchronization mechanisms). Alternatively, processing threads implementing method 500 (and, similarly, method 600) may be executed asynchronously with respect to each other. Various operations of methods 500 and 600 may be performed in a different order compared with the order shown in FIGS. 5 and 6. Some operations of the methods may be performed concurrently with other operations. In at least one embodiment, one or more operations shown in FIGS. 5 and 6 may not always be performed.

FIG. 5 is a flow diagram of an example method 500 of pyramid optical flow processing with identification and handling of object boundary pixels at the highest resolution level, according to at least one embodiment. Method 500 may be performed in the context of video game processing, automotive applications, video content streaming, synthetic image/video generation, industrial/traffic/environmental/etc. monitoring, and many other contexts. Method 500 may be used to obtain an optical flow for an image. The image may have a plurality of pixels of any suitable dimensions, e.g., 720×480 pixels, 1280×720 pixels, 1920×1080 pixels, or may be an image of any other size. The image may be a black-and-white image or a color image. The image may be a part of any video feed or a set of two or more images. The video feed or the set of images may further include a reference image relative to which the optical flow in the image is determined. The optical flow may be any representation of motion of objects depicted in the image relative to the depictions of the same objects in the reference image. In some embodiments, the optical flow is represented as a map (field) of pixel displacements (motion vectors) MV(x, y) as a function of pixel location in the image (or in the reference image). Motion vectors may have multiple components associated with pixel displacements along different directions (dimensions of space). In some embodiments, motion vectors may be specified in Cartesian coordinates, with x and y being the coordinates along the respective Cartesian axes. The components of the motion vectors (e.g., $MV_x$, $MV_y$, . . . ) may specify corresponding displacements along the respective Cartesian axes. In some embodiments, any other sets of coordinates (and motion vector components) may be used, e.g., polar coordinates, and the like. Although for brevity and conciseness, method 500 (as well as method 600) is described with reference to pixels, substantially similar techniques may be used to generate an optical flow in three-dimensional images partitioned into voxels. In such embodiments, motion vectors may have three components and may be defined on a three-dimensional field, e.g., x, y, and z.

At block 510, processing units performing method 500 may obtain a first image layer (IL) for the image. The first image layer (e.g., 304 of FIG. 3A) may include a first downscaled representation of the image; the first downscaled representation may be associated with a first scaling factor, e.g., scaling factor 2 (as in FIG. 3A), 4, or any other scaling factor. At block 520, method 500 may continue with the processing device associating a pixel (e.g., any pixel) of the plurality of pixels of the image with a first superpixel of the first IL. For example, as illustrated in FIG. 4B, pixel (5,4) is associated with superpixel (3,2) of the first IL 204.

At block 530, the processing units performing method 500 may determine a motion vector for the first superpixel and a motion vector for one or more neighbor superpixels of the first superpixel. For example, as illustrated in FIG. 4B, a motion vector for the first superpixel (3,2) may be $MV_1$(3,2)=(3,4) and a motion vector of a neighbor superpixel (3,3) may be $MV_1$(3,2)=(0,0). In some embodiments, the one or more neighbor superpixels may include nearest neighbor superpixels of the first superpixel, e.g., superpixels of the shaded region 403 centered at superpixel (3,2). As illustrated with the top callout portion in FIG. 5, determining the motion vector for the one or more neighbor superpixels, and subsequently using the determined pixels for identifying the motion vector for the pixel, may be responsive to identifying that the first superpixel is an edge superpixel (block 532). For example, in some embodiments, to save computational costs, identification (and subsequent use) of multiple superpixels may be reserved for pixels (or superpixels) of the image that are boundary (edge) pixels. In some embodiments, identifying that the first superpixel is a boundary superpixel may involve determining that the motion vector for the first superpixel is different from the motion vector for at least some of the one or more neighbor superpixels by at least a threshold value. The threshold value for the difference in motion vectors may be one pixel along any direction (e.g., (0,1) or (1,0)) or any other preselected threshold absolute value $\overline{MV_T}$ for the motion vector. For example, if $\sqrt{(MV_x)^2+(MV_y^2}>MV_T$, for any neighbor superpixel of the first superpixel, the processing units performing method 500 may classify the first superpixel as a boundary superpixel and identify motion vectors of multiple neighbors (e.g., all nearest neighbors) of the first superpixel.

In some embodiments, the depth level of various pixels and superpixels may be known and used for optimization of the optical flow processing. For example, as indicated by block 534, the one or more neighbor superpixels selected for identification of the motion vector of the pixel (at block 540 below) may have the same depth level as the pixel. For example, the neighbor superpixels whose depth level is different from the depth level of the pixel may be assumed to be unrelated to the pixels and excluded from further processing.

At block 540, method 500 may continue with the processing units identifying a motion vector for the pixel using the motion vector for the first superpixel and the motion vectors for the one or more neighbor superpixels. For example, as indicated with the bottom callout portion of FIG. 5, identifying the motion vector for the pixel may include, at block 542, selecting, from a group of pixels of a reference image (e.g., reference image 308 of FIG. 3B), a matching pixel (e.g., pixel (12,11) in FIG. 3B). In some embodiments, the group of pixels of the reference image may include pixels of a search window associated with the motion vector for the first superpixel. For example, pixels of search window 412 in FIG. 4B may be associated with the motion vector (used as a hint) $MV_1$=(3,2) for the first superpixel. This motion vector may indicate that the center of search window 412 may be displaced relative to the pixel (e.g., pixel (5,4) in FIG. 4B) by an upscaled (with the first scaling factor, e.g., 2) motion vector, e.g., $MV_0$=2·$MV_1$=(6, 8). In some embodiments, additional one or more search windows may be identified (e.g., search window 414) and the group of pixels may include pixels of the one or more additional search windows. Each of the one or more additional search windows may be associated with a corresponding motion vector for the one or more neighbor superpixels. For example, search window 414 may be associated with the motion vector $MV_1$=(0,0) for the neighbor superpixel (3,3). Similarly to the search window (e.g., search window 412) associated with the motion vector for the first superpixel, each of the one or more additional search windows may be centered at a location that is determined by an upscaled, with the first scaling factor, respective motion vector for the one or more neighbor superpixels. In some embodiments, selecting the matching pixel may include optimizing a cost function characterizing similarity of a neighborhood of the pixel (e.g., match window 303 in image 302 as depicted in FIG. 3C) and a corresponding neighborhood of the matching pixel (e.g., match window 305-1 or 305-2 in FIG. 3C).

At block 550, method 500 may continue with the processing units generating the optical flow for the image. The optical flow for the image may include motion vectors identified (as described above in conjunction with blocks 520-540) for each of the plurality of pixels of the image. It should be understood that the plurality of pixels of the image may include all pixels of the image, but may also include fewer than all pixels of the image. For example, some pixels may lack motion vectors, e.g., pixels that depict new objects or portions of new objects that are not present in the previously obtained reference image.

At block 560, method 500 may continue with the processing units using the image and the generated optical flow for the image to generate one or more additional images. For example, the processing units may parse the identified motion vectors for various pixels of the image into N parts, e.g., by dividing each motion vector into N equal or unequal parts and use the obtained new motion vectors to generate additional images using intermediate (interpolated) positions of the respective pixels. Various operations that use the generated optical flow may be facilitated by an API (e.g., optical flow API) 122 that provides a user access to the generated optical flow.

FIG. 6 is a flow diagram of an example method 600 of pyramid optical flow processing with identification and handling of object boundary pixels at reduced resolution levels, according to at least one embodiment. Method 600 may be performed together with method 500 and may be used for the same applications and contexts as method 500. Operations of method 600 may be performed in addition to operations of method 500 in the instances where more than one image layer is used for representing a given (highest resolution) image. For example, method 600 may use the first IL (referenced in conjunction with method 500) and may additionally use a second IL, third IL, and so on. Each IL may include superpixels of progressively decreasing resolution (increasing coarseness), as described above in conjunction with FIG. 3A. In some embodiments, a final IL of the plurality of ILs may include superpixels whose motion vectors are provided as an input that is external to the image, e.g., application-specified motion vectors, user-provided motion vectors, and the like.

At block 610, method 600 may include obtaining a second (or, more generally, j-th) IL that includes a second (or, more generally, j-th) downscaled representation of the image. The second downscaled representation may be associated with a second (or, more generally, j-th) scaling factor. For example, the second (or, more generally, j-th) scaling factor may be equal to $S^2$ (or, more generally, $S^j$), where S is the first scaling factor.

At block 620, the processing units performing method 600 may associate the first (or, more generally, j−1-th) superpixel of the first IL with a second (or, more generally, j-th) superpixel; the second (or, more generally, j-th) superpixel may belong to the second (or, more generally, j-th) IL.

At block 630, the processing units performing method 600 may determine a motion vector for the second (or, more generally, j-th) superpixel and a motion vector for each of one or more neighbor superpixels of the second (or, more generally, j-th) superpixel.

At block 640, the processing units performing method 600 may identify the motion vector for the first (or, more generally, j−1-th) superpixel using the motion vector for the second (or, more generally, j-th) superpixel and the motion vector for each of the one or more neighbor superpixels of the second (or, more generally, j-th) superpixel. Blocks 610-640 may be repeated for all available ILs.

Figure 7:
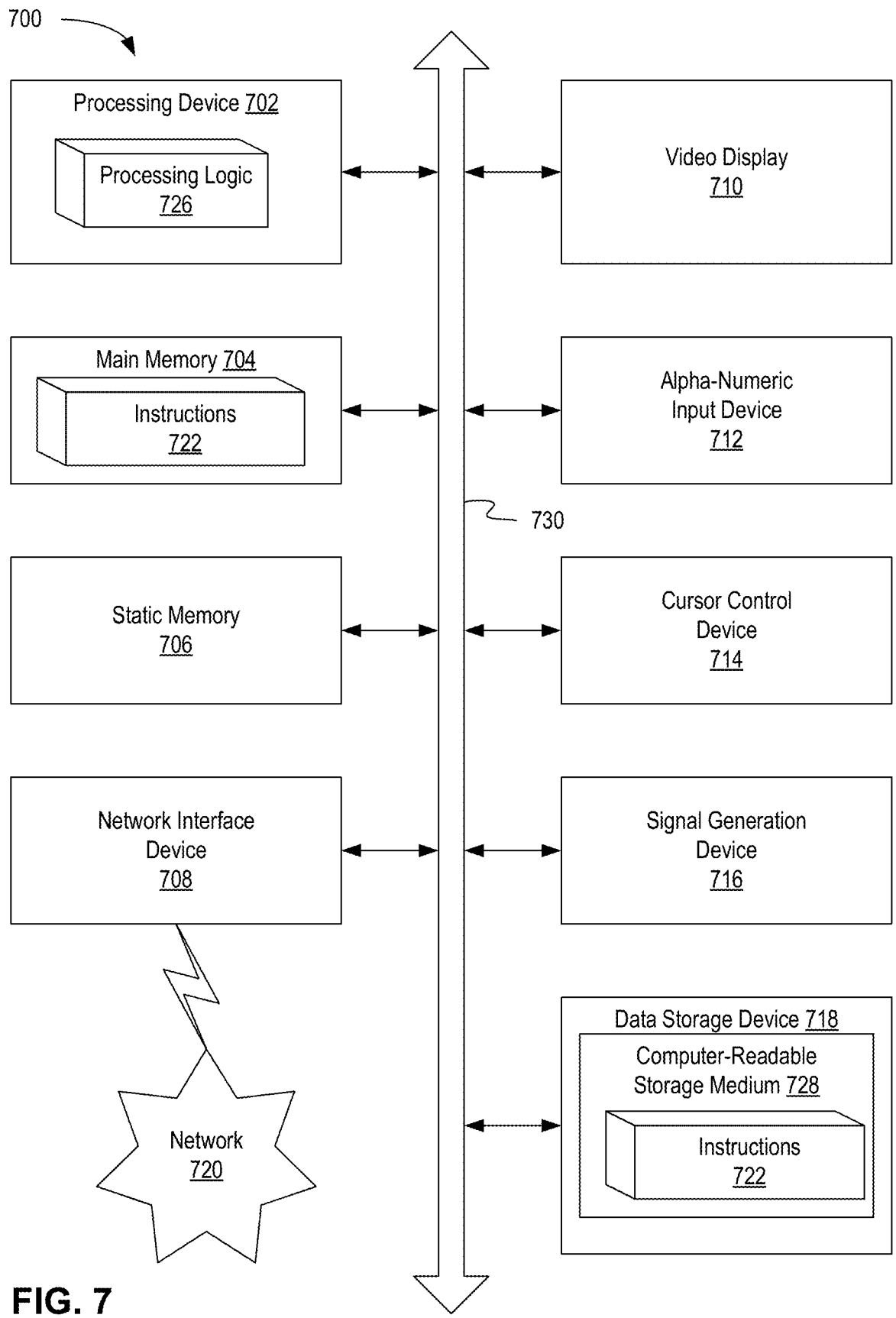
FIG. 7 depicts a block diagram of an example computer system operating in accordance with some implementations of the present disclosure.

FIG. 7 depicts a block diagram of an example computer system 700 operating in accordance with some implementations of the present disclosure. In various illustrative examples, example computer system 700 may be or include image processing server 101, client device 140, and/or application server 160, illustrated in FIG. 1A, a computing device 102 illustrated in FIG. 1B. Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing methods 500 and 600 of pyramid optical flow processing with efficient identification and handling of object boundary pixels.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing methods 500 and 600 of pyramid optical flow processing with efficient identification and handling of object boundary pixels.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within the spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method to obtain an optical flow for an image having a plurality of pixels, the method comprising:
    obtaining a first image layer (IL) that comprises a first downscaled representation of the image, wherein the first downscaled representation is associated with a first scaling factor;
    associating a pixel of the plurality of pixels of the image with a first superpixel of the first IL;
    determining a motion vector (MV) for the first superpixel and a MV for one or more neighbor superpixels of the first superpixel;
    identifying a MV for the pixel using the MV for the first superpixel and the MVs for the one or more neighbor superpixels;
    generating the optical flow for the image, wherein the optical flow comprises MVs for each of the plurality of pixels of the image; and
    generating, using the image and the optical flow for the image, one or more additional images.

2. The method of claim 1, wherein using the MV for the one or more neighbor superpixels for identifying the MV for the pixel is responsive to identifying that the first superpixel is an edge superpixel.

3. The method of claim 2, wherein identifying that the first superpixel is an edge superpixel comprises determining that the MV for the first superpixel is different from the MV for at least some of the one or more neighbor superpixels by at least a threshold value.

4. The method of claim 1, wherein the one or more neighbor superpixels have a same depth level as the pixel.

5. The method of claim 1, wherein the one or more neighbor superpixels comprise a plurality of nearest neighbor superpixels of the first superpixel.

6. The method of claim 1, wherein identifying the MV for the pixel further comprises:
    selecting, from a group of pixels of a reference image, a matching pixel, wherein the group of pixels comprises:
        pixels within a search window associated with the MV for the first superpixel, and
        pixels within one or more additional search windows, wherein each of the one or more additional search windows is associated with a corresponding MVs for the one or more neighbor superpixels.

7. The method of claim 6, wherein each of the one or more additional search windows is centered at a location determined by an upscaled, with the first scaling factor, respective MVs for the one or more neighbor superpixels.

8. The method of claim 6, wherein selecting the matching pixel comprises optimizing a cost function characterizing similarity of a neighborhood of the pixel and a corresponding neighborhood of the matching pixel.

9. The method of claim 1, further comprising:
obtaining a second IL that comprises a second downscaled representation of the image, wherein the second downscaled representation is associated with a second scaling factor;
associating the first superpixel of the first IL with a second superpixel, wherein the second superpixel belongs to the second IL;
determining a MV for the second superpixel and a MV for each of one or more neighbor superpixels of the second superpixel; and
identifying the MV for the first superpixel using the MV for the second superpixel and the MV for each of the one or more neighbor superpixels of the second superpixel.

10. The method of claim 9, wherein the first IL and the second IL are ILs of a plurality of ILs for the image, and wherein a final IL of the plurality of ILs comprises superpixels whose MVs are provided as an input that is external to the image.

11. An optical flow accelerator comprising:
one or more circuits to:
obtain a first image layer (IL) that comprises a first downscaled representation of an image having a plurality of pixels, wherein the first downscaled representation of the image is associated with a first scaling factor;
associate a pixel of the plurality of pixels of the image with a first superpixel of the first IL; and
determine a motion vector (MV) for the first superpixel and a MV for one or more neighbor superpixels of the first superpixel; and
one or more memory buffers to:
store the determined MVs, wherein the one or more circuits are further to:
identify a MV for the pixel using the MV for the first superpixel and the MVs for the one or more neighbor superpixels;
generate an optical flow for the image, wherein the optical flow comprises MVs for each of the plurality of pixels of the image; and
generate, using the image and the optical flow for the image, one or more additional images.

12. The optical flow accelerator of claim 11, wherein the one or more circuits are to:
identify the first superpixel is an edge superpixel based on the MV for the first superpixel being different from the MV for at least some of the one or more neighbor superpixels by at least a threshold value.

13. The optical flow accelerator of claim 11, wherein the one or more neighbor superpixels comprise a plurality of nearest neighbor superpixels of the first superpixel.

14. The optical flow accelerator of claim 11, wherein to identify the MV for the pixel, the one or more circuits are to:
select, from a group of pixels of a reference image, a matching pixel, wherein the group of pixels comprises:
pixels within a search window associated with the MV for the first superpixel, and
pixels within one or more additional search windows, wherein each of the one or more additional search windows is associated with a corresponding MVs for the one or more neighbor superpixels.

15. The optical flow accelerator of claim 11, wherein the one or more circuits are further to:
obtain a second IL that comprises a second downscaled representation of the image, wherein the second downscaled representation is associated with a second scaling factor;
associate the first superpixel of the first IL with a second superpixel, wherein the second superpixel belongs to the second IL;
determine a MV for the second superpixel and a MV for each of one or more neighbor superpixels of the second superpixel; and
identify the MV for the first superpixel using the MV for the second superpixel and the MV for each of the one or more neighbor superpixels of the second superpixel;
and wherein the one or more memory buffers are further to:
store the MV for the second superpixel and the MV for each of one or more neighbor superpixels of the second superpixel.

16. The optical flow accelerator of claim 15, wherein the first IL and the second IL are ILs of a plurality of ILs for the image, and wherein a final IL of the plurality of ILs comprises superpixels whose MVs are provided as an input that is external to the image.

17. A system comprising:
a memory device; and
a processing device communicatively coupled to the memory device, the processing device to:
obtain a first image layer (IL) that comprises a first downscaled representation of an image having a plurality of pixels, wherein the first downscaled representation of the image is associated with a first scaling factor;
associate a pixel of the plurality of pixels of the image with a first superpixel of the first IL;
determine a motion vector (MV) for the first superpixel and a MV for one or more neighbor superpixels of the first superpixel;
identify a MV for the pixel using the MV for the first superpixel and the MVs for the one or more neighbor superpixels;
generate an optical flow for the image, wherein the optical flow comprises MVs for each of the plurality of pixels of the image; and
generate, using the image and the optical flow for the image, one or more additional images.

18. The system of claim 17, wherein the processing device is further to:
provide, via an application programming interface, a user access to the generated optical flow.

19. The system of claim 17, wherein the processing device is further to:
identify the first superpixel is an edge superpixel based on the MV for the first superpixel being different from the MV for at least some of the one or more neighbor superpixels by at least a threshold value.

20. The system of claim 17, wherein the processing device is further to:
obtain a second IL that comprises a second downscaled representation of the image, wherein the second downscaled representation is associated with a second scaling factor;

associate the first superpixel of the first IL with a second superpixel, wherein the second superpixel belongs to the second IL;
determine a MV for the second superpixel and a MV for each of one or more neighbor superpixels of the second superpixel; and
identify the MV for the first superpixel using the MV for the second superpixel and the MV for each of the one or more neighbor superpixels of the second superpixel.

* * * * *